United States Patent [19]

Krogmann

[11] Patent Number: 4,461,089
[45] Date of Patent: Jul. 24, 1984

[54] INSTRUMENT FOR THE AUTOMATIC DETERMINATION OF NORTH DIRECTION

[75] Inventor: Uwe Krogmann, Überlingen-Nussdorf, Fed. Rep. of Germany

[73] Assignee: Bodenseewerk Geratetechnik GmbH, Fed. Rep. of Germany

[21] Appl. No.: 437,813

[22] Filed: Oct. 29, 1982

[30] Foreign Application Priority Data

Nov. 3, 1981 [DE] Fed. Rep. of Germany ....... 3143527

[51] Int. Cl.³ ............................................ G01C 19/38
[52] U.S. Cl. .................................................... 33/324
[58] Field of Search ................. 33/324, 318, 331, 316, 33/317 R, 317 D

[56] References Cited

U.S. PATENT DOCUMENTS 3,279,086 10/1966 Schlitt et al. .......................... 33/324
4,399,365 4/1983 Riethmuller ...................... 33/324 X Primary Examiner—Harry N. Haroian

[57] ABSTRACT

By means of a two-axis, electrically restrained gyro with vertical spin axis, North direction is determined from the ratio of the horizontal components of the angular rate of the earth. The gyro is rotatable about a vertical axis into 0°-, 90°-, 180°- and 270°-positions. The signals thus obtained are stored. A signal processing circuit operating with various differences of these signals and ratios of such differences provides the North deviation unaffected by gyro drift and scale factor error.

5 Claims, 7 Drawing Figures

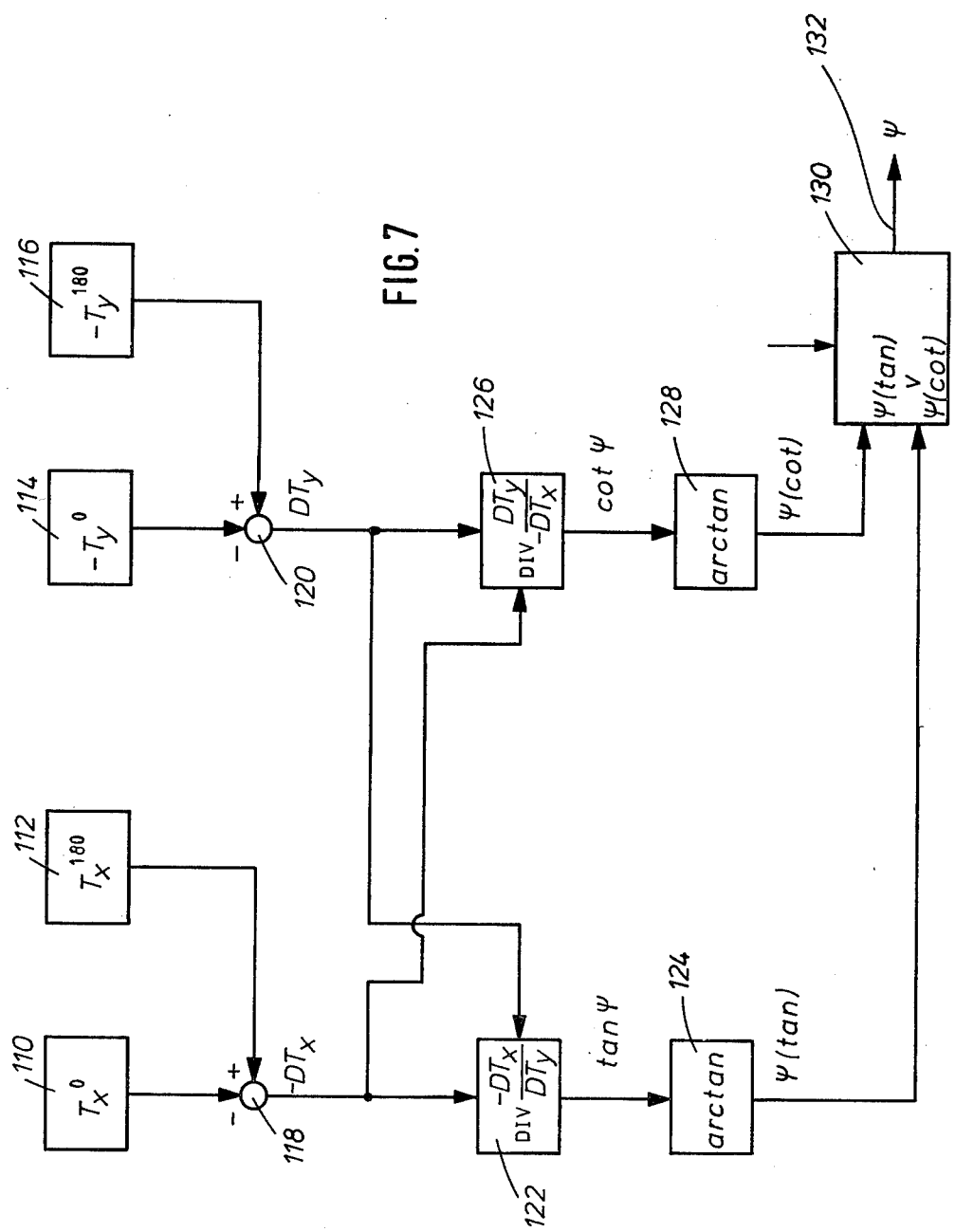

INSTRUMENT FOR THE AUTOMATIC DETERMINATION OF NORTH DIRECTION

The invention relates to an instrument for the automatic determination of North direction by means of a gyro influences by the rotation of the earth, wherein (a) the gyro is a two-gyro, the spin axis of which is substantially vertical, (b) a position pickoff and a torquer are provided on each of the two mutually perpendicular input axes of the gyro, (c) the signal of each position pickoff associated with one input axis is applied crosswise to the torquer of the respective other input axis to restrain the gyro electrically with its spin axis to the vertical, (d) the gyro is rotatable by a servomechanism from an initial position (0°-position) through 180° about a vertical axis coincident with the spin axis into a 180°-position, and (e) a north deviation computer (FIG. 6) is provided, which comprises (e$_1$) memories for storing the two signals supplied to the torquers in the 0°-position, (e$_2$) difference forming means for generating signals representing the difference of signals which are supplied to one or the other torquer, respectively, in different positions of the gyro determined by the servomechanism, and (e$_3$) quotient forming means for forming the quotient of such differences to provide a trigonometric function of the azimuth angle between one input axis of the gyro and North.

The German Pat. No. 2 741 274 is based on the fact that the signals $U_x$ and $U_y$ applied to the torquers and restraining the gyro are interrelated with the components $\Omega_y$ and $\Omega_x$ of the angular rate of the earth referenced to the horizontal input axes x and y by the following relations:

$$\frac{U_x K_{Tx}}{H} = \frac{M_x}{H} = \Omega_y \quad (1)$$

$$\frac{U_y \cdot K_{Ty}}{H} = \frac{M_y}{H} = -\Omega_x, \quad (2)$$

wherein $M_x$ is the torque which appears at the torquer acting about the x-axis, $M_y$ is the torque which appears at the torquer acting about the y-axis, and H is the angular momentum of the gyro.

From the ratio $$\frac{K_{Tx} \cdot U_x}{K_{Ty} \cdot U_y} = \frac{\Omega_y}{\Omega_x} = \tan\psi \quad (3)$$

the North deviation can be determined in accordance with $$\psi = \arctan \frac{K_{Tx} \cdot U_x}{K_{Ty} \cdot U_y} \quad (4)$$

This relation is based on idealized conditions, which are not present in practice. In particular the following sources of errors occur:

(a) Due to assembly tolerances, the gyro input axes x and y do not coincide exactly with the housing-fixed reference system $x_G$, $y_G$, $z_G$, on which the signal processing is based. These errors can be characterized by angles $\alpha_{ij}$, wherein the indices i and j stand for variables of x,y and z and $x_G$, $y_G$, $z_G$, respectively, and i represents an input axis and j represents an axis of the reference system. Thus $\alpha_{xy}$ is, for example, is the rotation of the input axis x about the coordinate axis $y_G$.

(b) Accelerations may act on the system. These accelerations can be represented by the components $a_x$, $a_y$ and $a_z$ in the housing-fixed coordinate system $x_G$, $y_G$, $z_G$.

(c) There may be a mass unbalance represented by a mass unbalance coefficient m.

(d) There may be an anisoelasticity represented by an anisoelasticity coefficient n.

(e) There may be a mass anisotropy, as axial and polar moments of inertia of the gyro rotor are not equal. This is represented by a mass anisotropy coefficient:

$$\frac{(C - A)}{H} \left[ \frac{1}{o/h} \right].$$

(f) There may be uncompensated, fixed gyro drift $B_x$, $B_y$ [o/h] about the x- and y-axes, respectively.

(g) Eventually a quadrature coefficient q has to be taken into account.

Due to these errors, the gyro by its torquers, instead of equations (1) and (2), measures the following signals:

$$\frac{M_x^{(1)}}{H} = T_x^{(1)} = \Omega_y + \alpha_{yx}\Omega_z - \alpha_{yz}\Omega_x - ma_y + qa_x + \quad (5)$$

$$na_y a_z + \frac{C-A}{H} \Omega_z \Omega_y + B_y$$

$$\frac{-M_y^{(1)}}{H} = -T_y^{(1)} = \Omega_x + \alpha_{xz}\Omega_y - \alpha_{xy}\Omega_z - ma_x - qa_y + \quad (6)$$

$$na_x \cdot a_z + \frac{C-A}{H} \Omega_z \Omega_x + B_x$$

Therefore measurement of the North deviation $\psi$ in accordance with equation (4) is falsified by the disturbing influences mentioned.

German Auslegeschrift No. 2 903 282 shows ways of at least partially eliminating the falsification of the measurement due to disturbing influences with an instrument defined in the beginning.

One solution (FIGS. 6 to 8 of German Auslegeschrift No. 2 903 282), which is applicable in particular in those cases, where the fixed gyro drift ($B_y$) is the dominating disturbing influence, consists in that the North deviation computer comprises a memory for storing the two signals supplied to the torquers, that the gyro is rotatable by a servomechanism through 180° about a vertical axis coincident with the gyro spin axis, after these signals have been stored, that the signals then supplied to the torquers are applied to the North deviation computer, that the North deviation computer is adapted to provide signals $$DT_x = T_x^{(0)} - T_x^{(180)}$$

$$DT_y = T_y^{(180)} - T_y^{(0)}$$

wherein $$T_y^{(0)} = \frac{M_y^{(0)}}{H},$$

$$T_y^{(180)} = \frac{M_y^{(180)}}{H},$$

$$T_x^{(0)} = \frac{M_x^{(0)}}{H},$$

$$T_y^{(180)} = \frac{M_y^{(180)}}{H},$$

$M_x^{(0)}$ and $M_x^{(180)}$ are the stored signals and the signals applied to one torquer after the 180°-rotation, $M_y^{(0)}$ and $M_y^{(180)}$ are the stored signals and the signals applied to the other torquer after the 180°-rotation, H is the angular momentum of the gyro, and that the North deviation computer is adpated to provided a signal $$\psi = \arctan \frac{DT_x}{-DT_y}$$

as North deviation signal.

Such an arrangement permits elimination of the drifts of the gyro about its two input axes. However scale factor errors may occur due to non-linearities of the torquers and to temperature effects.

It is the object of the invention to eliminate also scale factor errors with an instrument of the type defined in the beginning.

According to the invention, this object is achieved in that (f) the gyro is rotatable by the servomechanism about the vertical axis in addition into a 90°-position and into a 270°-position, and (g) the North deviation computer comprises memories for storing the respective two signals supplied to the torquers in the 180°-position, the 90°-position and the 270°-position, and (h) the quotient forming means form the respective quotients of differences of signals such that (h₁) each difference is formed of two signals which are supplied to the same torquer in two positions of the gyro angularly spaced by 180°, (h₂) the signals which form the difference in the numerator are supplied to the same torquer as the signals which form the difference in the denominator of this quotient, and (h₃) the difference in the numerator is formed of signals which are associated with positions of the gyro angularly spaced by 90° from those position of the gyro which are associated with the signals forming the difference in the denominator.

It is advantageous, if (i) a first quotient is formed by the quotient forming means which has, (i₁) in its numerator, a difference of signals supplied to a first torquer and associated with the 0°-position and the 180°-position of the gyro, and, (i₂) in its denominator, a difference of signals supplied to the first torquer and associated with the 90°-position and the 270°-position of the gyro, (j) a second quotient is formed, which has, (j₁) in its numerator, a difference of signals supplied to the second torquer and associated with the 90°-position and the 270°-position, and, (j₂) in its denominator, a difference of signals supplied to the second torquer and associated with the 0°-position and the 180°-position, and (k) the Norht deviation computer comprises means for forming the arithmetic mean of the two quotients.

Thus an instrument is obtained, which is automatically compensated for the essential sources of error, namely drift and scale factor error.

In accordance with a further modification of the invention, it is possible that (a) the quotient forming means, at the same time, form a quotient of differences and the reciprocal value thereof, one quotient representing the tangent of the azimuth angle between one input axis and North and the other quotient representing the cotangent of this angle, and (b) the North deviation computer is adapted to form the arctangent and arccotangent, respectively, of these quantities to generate two values of the azimuth angle, and (c) the North deviation computer, in addition, comprises means for determining the quadrant of the azimuth angle, and (d) a selector circuit, (d₁) to which the two values of the azimuth angle derived from the arctangent and arccotangent are supplied, and (d₂) which outputs, depending on the quadrant, that value which can be derived from the quotient with optimum accuracy when taking the course of the arctangent and arccotangent functions, respectively, into account.

In this way is ensured that the azimuth angle is obtained with optimum accuracy.

Embodiments of the invention are described in greater detail hereinbelow with reference to the accompanying drawings.

FIG. 7 is a modified embodiment of the North deviation computer.

Figure 1:
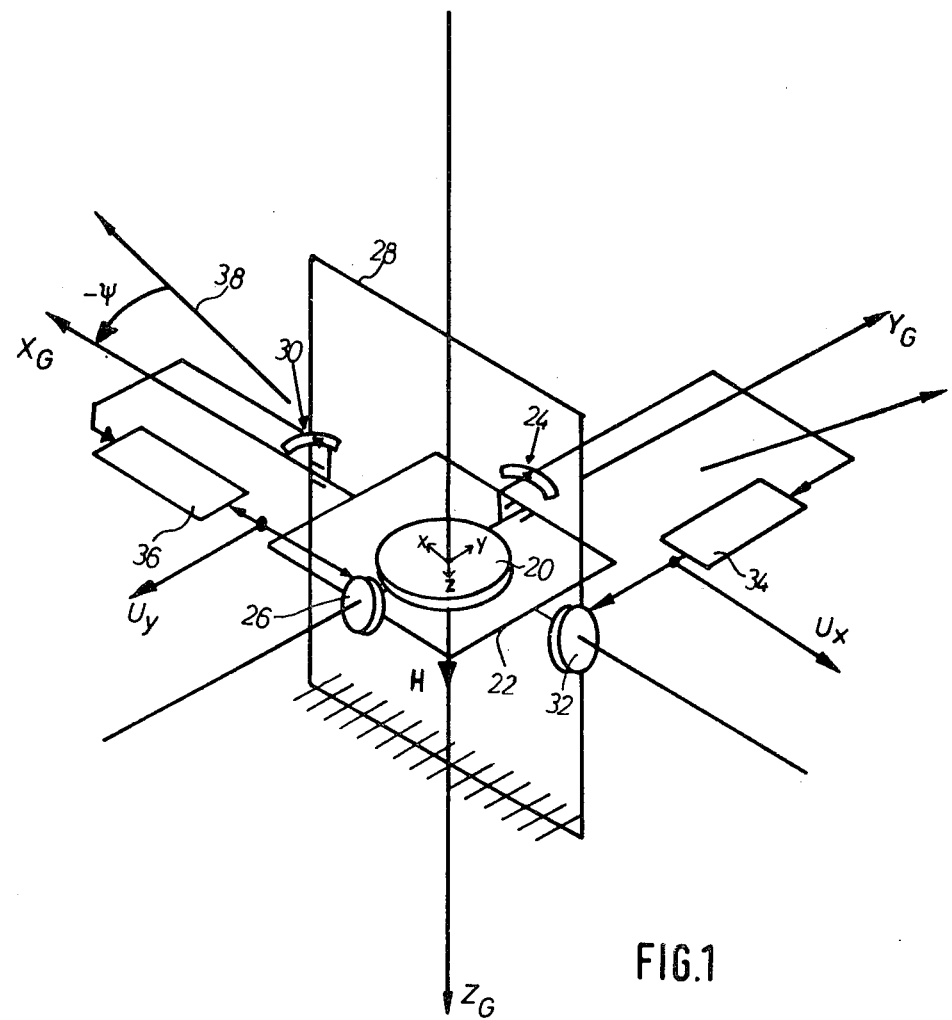
FIG. 1 is a schematic-perspective illustration of a gyro for determining North direction.
Figure 3:
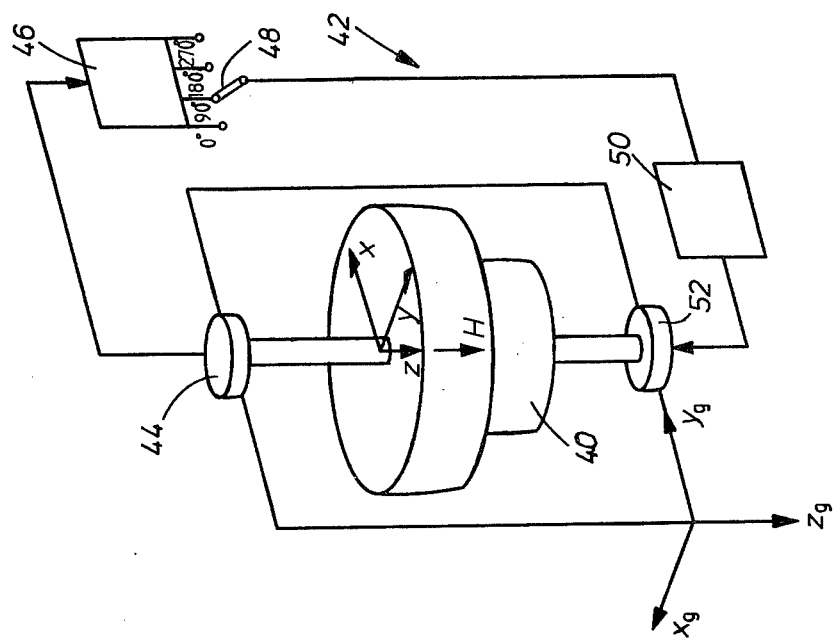
FIG. 3 is an illustration of the gyro similar to FIG. 2 in its 90°-position.
Figure 2:
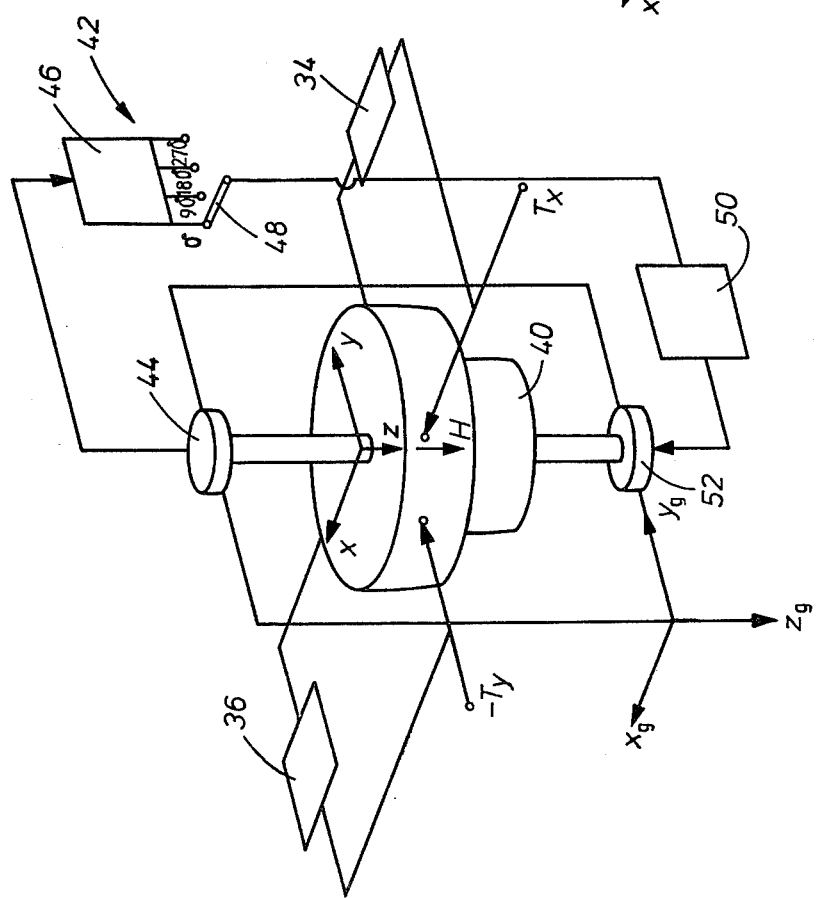
FIG. 2 is a schematic-perspective illustration of the gyro, which has the gimbal arrangement illustrated in FIG. 1 located in an outer casing, with the servomechanism in its 0°-position.
Figure 5:
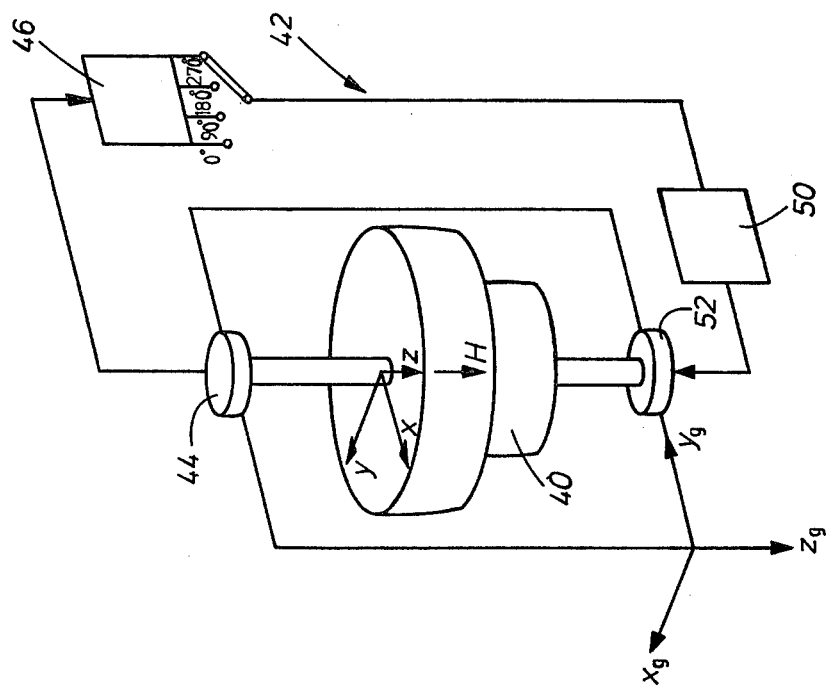
FIG. 5 is an illustration of the gyro similar to FIG. 2 in its 270°-position.
Figure 4:
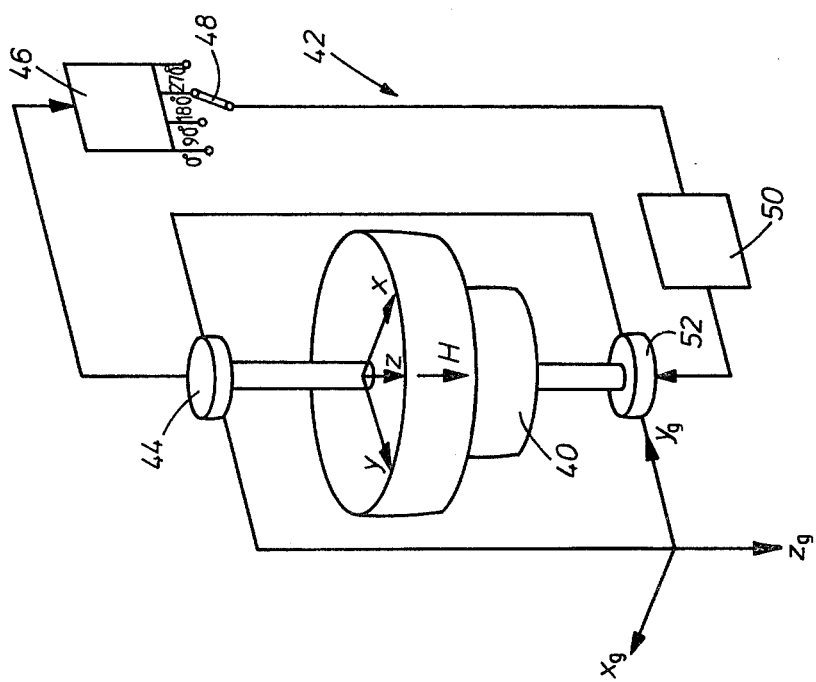
FIG. 4 is an illustration of the gyro similar to FIG. 2 in its 180°-position.

In FIG. 1 numeral 20 designates the housing of a gyro, the spin axis z of which is vertical. The gyro spin is designated H. The housing 20 is mounted in an inner gimbal 22 about a second input axis designated y, which is perpendicular to the spin axis z. A pickoff 24 is attached to the gimbal 22 and responds to deflection of the housing 20 about the second input axis y. On the opposite side, a torquer 26 is attached to the gimbal 22, said torquer being arranged to exert to torquer on the housing about the second input axis y. The inner gimbal 22 is mounted in an outer gimbal 28 about the first input axis x, which is perpendicular to the second input axis y.

A pickoff 30 is attached to the outer gimbal 28 and responds to deflection of the inner gimbal 22 relative to the outer gimbal 28 about the first input axis x. A torquer 32 is attached to the outer gimbal 28 on the opposite side, said torquer being arranged to exert a torque on the inner gimbal 22 about the first input axis x. The pickoffs 24 and 30 and the torquers 26 and 32 are interconnected crosswise, i.e. the pickoff 24 on the input axis y is connected through a frequency-dependent amplifier 34 to the torquer 32 on the input axis x, and the pickoff 30 on the input axis x is connected through a frequency-dependent amplifier 36 to the torquer 26 on the input axis y. The gains of the amplifiers 34 and 36 are so high, that the gyro housing 20 and the gimbals 22 and 28 are atually restrained electrically to the relative positions illustrated in FIG. 1.

In practice, the outer gimbal 28 forms a housing 40 (FIGS. 2 to 5). The housing 40 is mounted for rotation about a vertical axis $z_G$ coincident with the spin axis of the gyro, and is rotatable into different angular positions by a servomechanism 42. The servomechanism 42 schematically illustrated in FIGS. 2 to 5 comprises an angle sensor 44, which provides the anuglar position of the housing 40 with respect to a reference direction, positioning electronic means 46 with a position selector switch 48, follow-up electronic means 50, and a servomotor 52. The reference direction is formed by the $x_G$-axis of an instrument-fixed coordinate system $x_G$, $y_G$, $z_G$. The gyro defines a coordinate system x,y,z, the x-axis, as mentioned hereinbefore, being the first input axis and the y-axis being the second input axis, while the z-axis coincides with the spin axis of the gyro and, in all positions, with the $z_G$-axis. The servomechanism 42 rotates the housing 40, i.e. the gimbal 28 of FIG. 2, into four different positions depending on the position of the switch 48. In the 0°-position illustrated in FIGS. 1 and 2, the x-axis, i.e. the input axis of the first gyro, coincides with the $x_G$-axis of the instrument-fixed coordinate system serving as reference direction. In the 90°-position illustrated in FIG. 3, the x-axis of the gyro points into the direction of the $y_G$-direction of the instrument-fixed coordinate system. In the 180°-position illustrated in FIG. 4, the x-axis points into the direction of the negative $x_G$-axis of the instrument-fixed coordinate system. The gyro with the gimbal 22 and 28, the pickoffs 24 and 30, and the torquers 26 and 32 is then rotated through 180° about the z-axis relative to the position illustrated in FIG. 1. In the 270°-position illustrated in FIG. 5, eventually, the x-axis of the gyro points into the direction of the negative $y_G$-axis of the housing-fixed coordinate system. The pickoff 30 of FIG. 1 would then be located on the lefthand side in the front, about where the torquer 26 is shown. By the rotation also the position of the input axes x and y of the gyro relative to North direction and thus to the horizontal component of the angular rate of the earth is changed.

Figure 6:
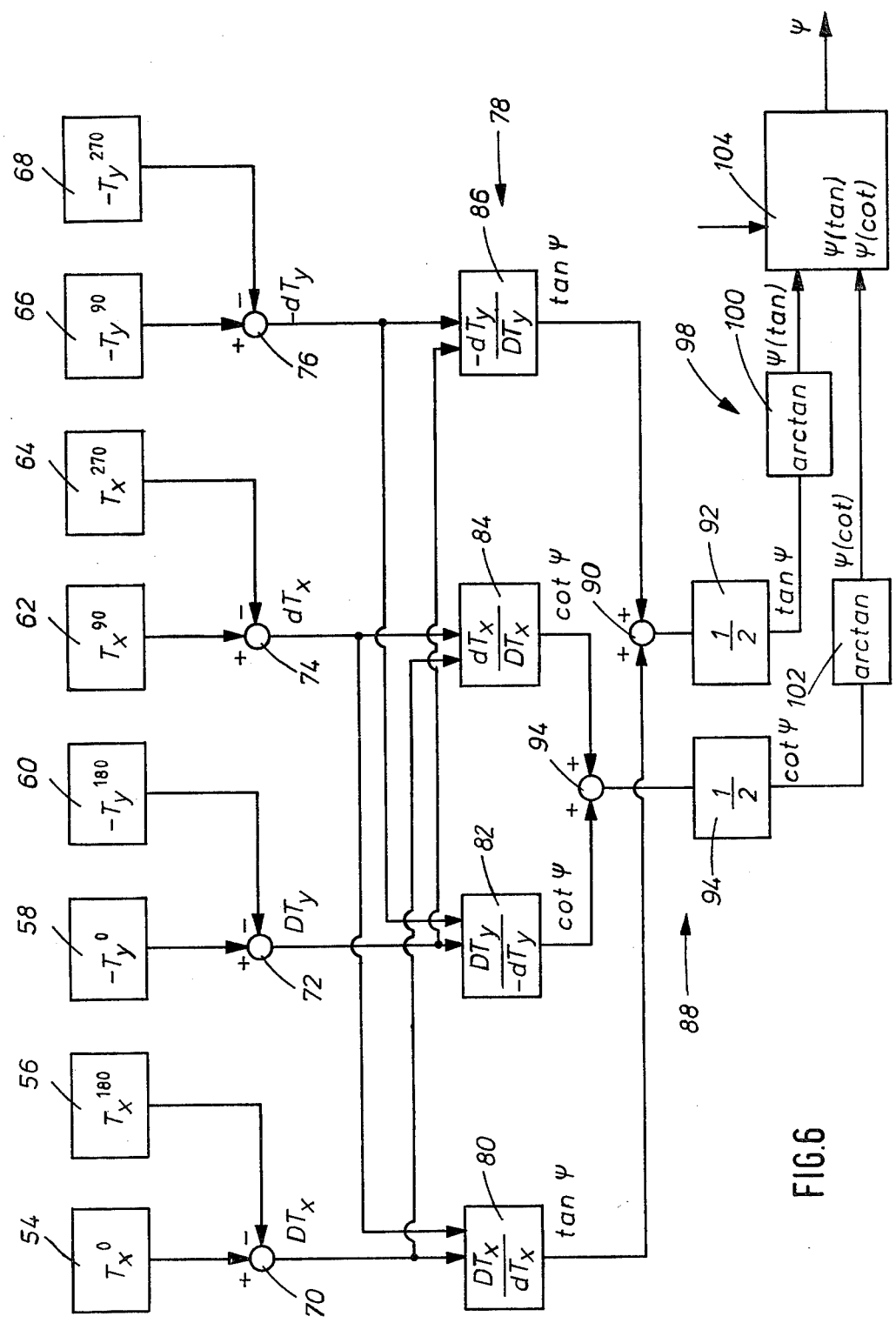
FIG. 6 is a block diagram of the North deviation computer.

The North deviation computer illustrated in FIG. 6 has memories for the signals supplied to the torquers in the various positions (preferably with the factor 1/H). Memories 54 and 56 store the signals $T_x^0$ and $T_x^{180}$ which are applied to the torquer 32 on the first input axis x by the pickoff 24 and through the high gain amplifier 34 in the 0°-position and in the 180°-position, respectively, to restrain the gyro electrically to its position illustrated. Memories 58 and 60 store (with negative sign) the signals $-T_y^{90}$ and $-T_y^{180}$ which are applied to the torquer 26 on the second input axis y by the pickoff 30 through the high gain amplifier 26 in the 90°-position and the 180°-position to restrain the gyro electrically to its position illustrated. Memories 62 and 64 store the signals $T_x^{90}$ and $T_x^{270}$ which are applied to the torquer 32 on the first input axis x in the 90°-position and the 270°-position, respectively. Memories 66 and 68 store, with negative sign, the signals $-T_y^{90}$ and $-T_y^{270}$, respectively, which are applied to the torquer 26 on the second input axis y in the 90°-position and the 270°-position, respectively.

The gyro is moved by the servomechanism 42 successively into the various positions illustrated in FIGS. 2 to 5. The signals supplied to the torquers 26 and 32 in these positions are memorized in the memories 54 to 68. These signals are processed as follows.

In a summing point 70, the difference of the signal $T_x^0$ stored in memory 54 and of the signal $T_x^{180}$ stored in memory 56 is formed. A difference signal $$DT_x = T_x^0 - T_x^{180} \qquad (7)$$

results.

In a summing point 72 the difference of the signal $-T_y^0$ stored in memory 58 and of the signal $-T_y^{180}$ stored in memory 60 is formed. A difference signal $$DT_y = T_y^{180} - T_y^0 \qquad (8)$$

results.

In a summing point 74 the difference of the signal $T_x^{90}$ stored in memory 62 and of the signal $T_x^{270}$ stored in memory 64 is formed. A difference signal $$dT_x = T_x^{90} - T_x^{180} \qquad (9)$$

results.

In a summing point 76 the difference of the signal $-T_y^{270}$ stored in memory 68 and of the signal $-T_y^{90}$ stored in memory 66 is formed. A difference signal $$-dT_y = T_y^{90} - T_y^{270} \qquad (10)$$

results.

Furthermore the North deviation computer of FIG. 6 comprises quotient forming means 78 with a quotient former 80, a quotient former 82, a quotient former 84 and a quotient former 86. The quotient former 80 forms the quotient $$Dt_x/dT_x$$

of the difference signals from the summing points 70 and 74. The quotient former 82 forms the quotient $$DT_y/-dT_y$$

of the difference signals from the summing points 72 and 76. The quotient former 84 forms the quotient $$dT_x/DT_x$$

of the difference signals from the summing points 74 and 70, i.e. the reciprocal value of the quotient formed by the quotient former 80. The quotient former 86 forms the quotient $$-dT_y/DT_y$$

of the difference signals from the summing points 76 and 72, i.e. the reciprocal value of the quotient formed by the quotient former 82.

It can be shown that the signals provided by the quotient formers 80 and 86 represent tan $\psi$, the tangent of the azimuth or Nort deviation angle. Correspondingly the quotient former 82 and 84 provide cot $\psi$, the cotangent of this angle.

Means 88 are provided for forming the arithmetic mean of the tan $\psi$—and of the cot $\psi$—signals.

These means 88 comprise a summing point 90, in which the two values of tan $\psi$ from the quotient formers 80 and 86 are added, and means 92 for dividing the sum thus obtained by two. This yields a mean value signal $\overline{\tan}\ \psi$. Furthermore the means 88 comprise a summing point 94, in which the two values of cot $\psi$ from the quotient formers 82 and 84 are added, and means 96 for dividing the sum thus obtained by two. This yields a mean value signal $\overline{\cot}\ \psi$.

Furthermore the North deviation computer comprises means 98 for forming the arctangent and arccotangent functions, respectively, of the mean value signals $\overline{\tan}\ \psi$ and $\overline{\cot}\ \psi$, respectively, from the mean forming means 88. These means may comprise arctangent and arccotangent function generators 100 and 102, respectively. These function generators 100 and 102 provide signals $\psi$ (tan) and $\psi$ (cot), respectively, which represent the azimuth angle $\psi$, which was derived either from the tangent or from the cotangent.

Depending on the amount of the angle, this angle can be derived better and more accurately from the tangent or from the contangent. For this reason the North deviation computer comprises an evaluation circuit 104 to which the two values $\psi$ (tan) and $\psi$ (cot) derived from the arctangent and from the arccotangent, respectively, are applied. Depending on the quadrant this evaluation circuit 104 outputs that value $\psi$, which can be derived from the quotient or mean value of quotients with optimum accuracy taking the course of the arctangent and arccotangent function into account.

It will be noticed that the quotient forming means always form quotients of differences of signals. Each difference is formed of two signal which are supplied to the same torquer 26 or 32 in two positions of the gyro angularly spaced by 180°. $DT_x = T_x^0 - T_x^{180}$, i.e. the difference of signals which are both supplied to the torquer 32, in the 0°-position and in the 180°-position, and $dT_x = T_x^{90} - T_x^{270}$, i.e. the difference of signals which are both also supplied to the torquer 32, in the 90°-position and in the 270°-position angularly spaced therefrom by 180°. The signals which form the difference in the numerator of a quotient, in the present example $T_x^0$ and $T_x^{180}$, are supplied to the same torquer, namely 32, as the signals $T_x^{90}$ and $T_x^{270}$ which form the difference in the denominator of this quotient. Eventually the difference $DT_x$ in the numerator is formed of signals $T_x^0$ and $T_x^{180}$ which are associated with positions of the gyro, namely the 0°-position and the 180°-position, which are angularly spaced by 90° from the positions of the gyro, namely the 90°-position and the 270°-position, which are associated with the signals $T_x^{90}$ and $T_x^{270}$ forming the difference $dT_x$ in the denominator.

This can easily be verified also with respect to the other quotients.

It can also be seen that a respective first quotient, for example $DT_x/dT_x$ is formed by the quotient forming means 78 both for the tangent and for the cotangent, which quotient has in its numerator a difference $DT_x$ of signals $T_x^0$ and $T_x^{180}$ supplied to a first torquer 32 and associated with the 0°-position and the 180°-position of the gyro, and has in its denominator a difference $dT_x$ of signals $T_x^{90}$ and $T_x^{270}$ which are supplied to the first torquer 32 and are associated with the 90°-position and the 270°-position, respectively. A second quotient $-dT_y/DT_y$ has in its numerator a difference $dT_y$ of signals $-T_y^{90}$ and $T_y^{270}$ supplied to the second torquer 26 and associated with the 90°-position and the 270°-position, respectively, of the gyro, and has in its denominator a difference $DT_y$ of signals $-T_y^0$ and $T_y^{180}$ supplied to the second torquer 26 and associated with the 0°-position and the 180°-position, respectively, of the gyro.

The arithmetic mean of the quotients thus obtained is formed.

The determination of the North deviation with an instrument of the present type is based on determining the components of the angular rate of the earth about the two mutually perpendicular input axes x and y of the gyro and forming the ratio thereof. If there are scale factor errors, i.e. the ratio of signal to component of the angular rate of the earth of one input axis differs from that of the other one, this scale factor error will enter into the tangent of the North deviation angle. With the arrangement described, each quotient is formed of measuring signals which have been obtained with the same torquer. Thereby scale factor errors are eliminated.

Thus an instrument is provided with which both drifts of the gyro and scale factor errors do not affect the measuring result.

In the embodiment of FIG. 7 the gyro is rotatable into the 0°-position and into the 180°-position only. Four memories 110,112,114 and 116 are provided. In the memories 110 and 112, the signals $T_x^0$ and $T_x^{180}$, respectively, supplied to the torquer 32 in the 0°-position and in the 180°-position, respectively, are stored. In the memories 114 and 116 the signals $-T_y^0$ and $-T_y^{180}$ supplied to the torquer 26 in the 0°-position and in the 180°-position are stored.

In a summing point 118, the difference of the signal stored in memory 112 and of the signal stored in memory 110 are formed as first difference signal $$-DT_x = T_x^{180} - T_x^0.$$

In a second summing point 120 the difference of the signal stored in memory 114 and of the signal stored in the memory 116 is formed as second difference signal $$DT_y = T_y^{180} - T_y^0.$$

A quotient former 122 forms the quotient of the first and second difference signals $$-DT_x/DT_y.$$

This quotient represents tan $\psi$, the tangent of the azimuth or North deviation angle. An arctangent function generator 124 provides therefrom a value $\psi$ (tan) of the azimuth or North deviation angle derived from the tangent.

A quotient former 126 forms the quotient of the second and the first difference signals $$DT_y/-DT_x.$$

This is the reciprocal value of the quotient formed by quotient former 122 and represents cot ψ, the cotangent of the azimuth or North deviation angle. An arccotangent function generator 128 provides therefrom a value ψ (cot) of the azimuth or North deviation angle derived from the cotangent.

The two values ψ (tan) and ψ (cot) are applied to a selector circuit 130 which depending on the quadrant, outputs at an output 132 that azimuth angle signal which, in accordance with the courses of the tangent and cotangent functions, can be represented with optimum accuracy from the ratios $$-DT_x/DT_y \text{ or } DT_y/-DT_x,$$

respectively.

I claim:

1. Instrument for the automatic determination of North direction by means of a gyro influenced by the rotation of the earth, wherein
   (a) the gyro is a two-axis gyro, the spin axis (z) of which is substantially vertical,
   (b) a position pickoff (30,24) and a torquer (32,36) are provided on each of the two mutually perpendicular input axes (x,y) of the gyro,
   (c) the signal of each position pickoff (30,24) associated with one input axis (x,y) is applied crosswise to the torquer (26,32) of the respective other input axis (y,x) to restrain the gyro electrically with its spin axis (z) to the vertical,
   (d) the gyro is rotatable by a servomechanism (42) from an initial position (0°-position) through 180° about a vertical axis ($Z_G$) coincident with the spin axis (z) into a 180°-position, and
   (e) a north deviation computer (FIG. 6) is provided, which comprises
      ($e_1$) memories (54,58) for storing the two signals supplied to the torquers in the 0°-position,
      ($e_2$) difference forming means for generating signals representing the difference of signals which are supplied to one or the other torquer (26,32), respectively, in different positions of the gyro determined by the servomechanism (42), and
      ($e_3$) quotient forming means for forming the quotient of such differences to provide a trigonometric function of the azimuth angle between one input axis of the gyro and North,
   characterized in that
   (f) the gyro is rotatable by the servomechanism (42) about the vertical axis ($z_G$) in addition into a 90°-position and into a 270°-position, and
   (g) the North deviation computer comprises memories (54 to 68) for storing the respective two signals supplied to the torquers in the 180°-position, the 90°-position and the 270°-position, and
   (h) the quotient forming means (78) form the respective quotient of differences of signals such that
      ($h_1$) each difference is formed of two signals which are supplied to the same torquer (26,32) in two positions of the gyro angularly spaced by 180°,
      ($h_2$) the signals which form the difference in the numerator are supplied to the same torquer (26,32) as the signals which form the difference in the denominator of this quotient, and
      ($h_3$) the difference in the numerator is formed of signals which are associated with positions of the gyro angularly spaced by 90° from those positions of the gyro which are associated with the signals forming the difference in the denominator.

2. Instrument as set forth in claim 1, characterized in that
   (i) a first quotient is formed by the quotient forming means (78) which has,
      ($i_1$) in its numerator, a difference of signals supplied to a first torquer (for example 32) and associated with the 0°-position and the 180°-position of the gyro, and,
      ($i_2$) in its denominator, a difference of signals supplied to the first torquer (32) and associated with the 90°-position and the 270°-position of the gyro,
   (j) a second quotient is formed, which has,
      ($j_1$) in its numerator, a difference of signals supplied to the second torquer (26) and associated with the 90°-position and the 270°-position, and,
      ($j_2$) in its denominator, a difference of signals supplied to the second torquer (26) and associated with the 0°-position and the 180°-position, and
   (k) the North deviation computer comprises means (88) for forming the arithmetic mean of the two quotients.

3. Instrument as set forth in claim 1, characterized in that
   (a) the quotient forming means (78), at the same time, form a quotient of differences and the reciprocal value thereof, one quotient representing the tangent of the azimuth angle between one input axis and North and the other quotient representing the cotangent of this angle, and
   (b) the North deviation computer is adapted to form the arctangent and arccotangent, respectively of these quantities to generate two values of the azimuth angle, and
   (c) the North deviation computer, in addition, comprises means for determining the quadrant of the azimuth angle, and
   (d) a selector circuit (104),
      ($d_1$) to which the two values of the azimuth angle derived from the arctangent and arccotangent are supplied, and
      ($d_2$) which outputs, depending on the quadrant, that value which can be derived from the quotient with optimum accuracy when taking the course of the arctangent and arccotangent functions, respectively, into consideration.

4. Instrument as set forth in claim 2, characterized in that
   (a) the quotient forming means (78), at the same time, form a quotient of differences and the reciprocal value thereof, one quotient representing the tangent of the azimuth angle between one input azis and North and the other quotient representing the cotangent of this angle, and
   (b) the North deviation computer is adapted to form the arctangent and arccotangent, respectively of these quantities to generate two values of the azimuth angle, and
   (c) the North deviation computer, in addition, comprises means for determining the quadrant of the azimuth angle, and
   (d) a selector circuit (104),
      ($d_1$) to which the two values of the azimuth angle derived from the arctangent and arccotangent are supplied, and ($d_2$) which outputs, depending on the quadrant, that value which can be derived from the quotient with optimum accuracy when taking the course of the arctangent and arccotangent functions, respectively, into consideration.

5. Instrument for automatically determining North direction by means of a gyro influenced by the rotation of the earth, wherein the gyro is a two-axis gyro, the spin axis of which is substantially vertical, wherein the position of the gyro is picked off by position pickoffs and torquers are arranged to exert supporting torques on the gyro, whereby the spin axis of the gyro is kept vertical, wherein a position pickoff and a torquer are provided on each of two mutually perpendicular input axes of the gyro, wherein, furthermore, the signal of each position pickoff associated with one input axis is applied crosswise to the torquer of the respective other input axis to restrain the gyro electrically with its spin axis to the vertical, wherein, the signals supplied to the two torquers are supplied simultaneously to a North deviation computer, which from the ratio of the signals provides a signal representing the deviation of an instrument-fixed reference direction from North, wherein, furthermore, the North deviation computer comprises a memory for storing the two signals supplied to the torquers, wherein, furthermore, a servomechanism is arranged to rotate the gyro through 180° about a vertical axis coincident with the gyro spin axis, after these signals have been stored, and wherein the signals then supplied to the torquers are applied to the North deviation computer, and the North deviation computer is adapted to provide signals $$DT_x = T_x^{(o)} - T_x^{(180)}$$

$$DT_y = T_y^{(180)} - T_y^{(o)}$$

wherein $$T_y^{(o)} = \frac{M_y^{(o)}}{H}$$

-continued $$T_y^{(180)} = \frac{M_y^{(180)}}{H}$$

$$T_x^{(o)} = \frac{M_y^{(o)}}{H}$$

$$T_x^{(180)} = \frac{M_x^{(180)}}{H}$$

$M_x^{(0)}$ and $M_x^{(180)}$ are the stored signals and the signals applied to one of the torquers after the 180°-rotation, $M_y^{(0)}$ and $M_y^{(180)}$ are the stored signals and the signals applied to the other torquer after the 180°-rotation, and H is the angular momentum, wherein, eventually, the North deviation computer is further adapted to provide a signal $$\psi = \arctan \frac{DT_x}{-DT_y}$$

as North deviation signal,
characterized in that the North deviation computer
  (a) is, in addition adapted to provide an azimuth angle signal $$\psi = \text{arc ctg} \frac{DT_y}{-DT_x}$$

and
  (b) comprises means for determining the quadrant of the azimuth angle from the tangent and cotangent functions, as well as
  (c) a selector circuit (130)
    ($c_1$) to which the two values of the azimuth signal derived from the arctangent and arccotangent are applied, and
    ($c_2$) which outputs, depending on the quadrant, that azimuth angle signal, which in accordance with the courses of the tangent and cotangent functions can be derived from the ratios $-DT_x/DT_y$ and $DT_y/-DT_x$ with optimum accuracy.

* * * * *